United States Patent
Conzone et al.

(10) Patent No.: US 6,699,341 B2
(45) Date of Patent: Mar. 2, 2004

(54) PROCESS FOR THE FABRICATION OF GLASS CERAMIC STRUCTURES

(75) Inventors: Samuel David Conzone, Clarks Green, PA (US); Alexander J. Marker, III, Springbrook Township, PA (US)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 10/190,724

(22) Filed: Jul. 9, 2002

(65) Prior Publication Data

US 2002/0192422 A1 Dec. 19, 2002

Related U.S. Application Data

(62) Division of application No. 09/597,157, filed on Jun. 20, 2000.

(51) Int. Cl.[7] .................................. B32B 31/06
(52) U.S. Cl. ................ 156/89.11; 156/153; 156/325
(58) Field of Search .................. 156/89.11, 325, 156/153; 106/286.1, 286.2, 286.8

(56) References Cited

U.S. PATENT DOCUMENTS

| | | |
|---|---|---|
| 2,538,867 A | 1/1951 | Greger |
| 3,007,832 A | 11/1961 | Milne |
| 3,622,440 A | 11/1971 | Snedeker et al. |
| 3,778,283 A * | 12/1973 | von Freyhold .............. 106/603 |
| 3,793,105 A | 2/1974 | Birchall et al. |
| 3,880,632 A | 4/1975 | Podvigalkina |
| 3,997,700 A | 12/1976 | Jacquemin et al. |
| 4,005,172 A | 1/1977 | Birchall et al. |
| 4,052,254 A | 10/1977 | Harakas et al. |
| 4,075,120 A | 2/1978 | Myers et al. |
| 4,108,673 A | 8/1978 | Toratani et al. |
| 4,229,220 A | 10/1980 | Hirota |
| 4,239,645 A | 12/1980 | Izumitani et al. |

(List continued on next page.)

FOREIGN PATENT DOCUMENTS

| | | |
|---|---|---|
| DE | 19731075 A1 | 1/1999 |
| EP | 0 492 577 A2 | 7/1992 |
| EP | 0 617 527 | 9/1994 |
| EP | 0 775 674 A2 | 5/1997 |
| EP | 0 858 976 A2 | 8/1998 |
| EP | 0 867 985 A1 | 9/1998 |

(List continued on next page.)

OTHER PUBLICATIONS

Seka et al., "High–power phosphate–glass laser system: design and performance characteristics," 2219 Applied Optics, vol. 19 (2/80), No. 3 pp. 409–419.

(List continued on next page.)

*Primary Examiner*—Curtis Mayes
(74) *Attorney, Agent, or Firm*—Millen, White, Zelano & Branigan, P.C.

(57) ABSTRACT

A method for fabricating composite light-weighted glass ceramics, suitable for use as, e.g. mirror blanks or microlithography stages, at low temperatures is disclosed. Component pieces are polished then joined at low temperature using a silicate-containing joining liquid. Assembly is then performed in such a way that the joining liquid forms an interface between each component. After a period of low or slightly elevated temperature curing, rigid joints are formed throughout and the composite is dimensionally, vibrationally, and temperature stable and can withstand tensile stresses >4000 psi. The room-temperature cured composite can be heat treated using a slow, systematic temperature increase to dehydrate the joints. A sealing coating may optionally be provided to prevent excess dried joining liquid from flaking off the formed joint.

20 Claims, 7 Drawing Sheets

U.S. PATENT DOCUMENTS

| | | | |
|---|---|---|---|
| 4,248,732 A | 2/1981 | Myers et al. | |
| 4,406,681 A | 9/1983 | Rapp | |
| 4,451,312 A | 5/1984 | Nolte | |
| 4,661,284 A | 4/1987 | Cook et al. | |
| 4,767,725 A | 8/1988 | Mizutani et al. | |
| 4,770,811 A | 9/1988 | Myers | |
| 4,820,662 A | 4/1989 | Izumitani et al. | |
| 4,879,041 A | 11/1989 | Kurokawa et al. | |
| 4,883,215 A | 11/1989 | Goesele et al. | |
| 4,908,339 A | 3/1990 | Blount | |
| 4,917,934 A | 4/1990 | Sempolinski | |
| 4,929,387 A | 5/1990 | Hayden et al. | |
| 5,032,315 A | 7/1991 | Hayden et al. | |
| 5,039,631 A | 8/1991 | Krashkevich et al. | |
| 5,088,003 A | 2/1992 | Sakai et al. | |
| 5,238,518 A * | 8/1993 | Okubi et al. | 156/326 |
| 5,264,285 A | 11/1993 | Dougherty | |
| 5,334,559 A | 8/1994 | Hayden | |
| 5,346,865 A | 9/1994 | Aitken et al. | |
| 5,378,502 A | 1/1995 | Willard et al. | |
| 5,403,451 A | 4/1995 | Riviello et al. | |
| 5,413,620 A | 5/1995 | Henry | |
| 5,478,527 A | 12/1995 | Gustafson et al. | |
| 5,491,708 A | 2/1996 | Malone et al. | |
| 5,503,704 A | 4/1996 | Bower et al. | |
| 5,508,235 A | 4/1996 | Marker | |
| 5,526,369 A | 6/1996 | Hayden et al. | |
| 5,532,857 A | 7/1996 | Gertel et al. | |
| 5,543,648 A | 8/1996 | Miyawaki | |
| 5,578,179 A | 11/1996 | Demorest et al. | |
| 5,580,605 A | 12/1996 | Ogawa et al. | |
| 5,580,846 A | 12/1996 | Hayashida et al. | |
| 5,681,484 A | 10/1997 | Zanzucchi et al. | |
| 5,699,465 A | 12/1997 | Nakaya | |
| 5,843,767 A | 12/1998 | Beattie | |
| 5,846,638 A | 12/1998 | Meissner | |
| 5,851,938 A | 12/1998 | Nishii et al. | |
| 6,075,625 A | 6/2000 | Ainslie et al. | |
| 6,129,854 A | 10/2000 | Ramsey et al. | |
| 6,284,085 B1 * | 9/2001 | Gwo | 156/273.7 |
| 6,548,176 B1 * | 4/2003 | Gwo | 428/420 |

FOREIGN PATENT DOCUMENTS

| | | |
|---|---|---|
| GB | 909679 | 6/1959 |
| GB | 1000796 | 4/1963 |
| GB | 1060393 | 8/1963 |
| GB | 2 293 936 | 4/1996 |
| WO | WO 97/43117 | 11/1997 |

OTHER PUBLICATIONS

Taccheo et al., "Widely tunable single-frequency erbium-ytterbium phosphate glass laser," Appl. Phys. Lett. 68 (19), May 6, 1996, pp. 2621–2623.

Goldberg et al., "Repetitively pulsed mode–locked Nd:phosphate glass laser oscillator–amplifier system," Applied Optics, vol. 21, No. 8, Apr. 15, 1982, pp. 1474–1477.

International Search Report for PCT/US00/41721.

Joining Ceramics, Glass and Metal, Brockmann, University of Kalserslautern, Germany, Brockmann, May 17–19, 1993.

Spectroscopic Properties of $Nd^3$ Dopant Ions In Phosphate Laser Glass, Payne et al., Ceramic Transactions, vol. 28, 1992.

Thermal–Mechanical And Physical–Chemical Properties Of Phosphate Laser Glass, Elder et al., Ceramic Transactions, vol. 28, 1992.

Effect of Phosphate Glass Composition On The Rate Of Platinum Dissolution, Hayden et al., Ceramics Transactions, vol. 28, 1992.

Ion–Exchange Planar Lossless Splitter At 1.5$\mu$m, Roman et al., Electronic Letters, vol. 32, No. 4, 1996.

Phosphorus–An Outline of its Chemistry, Biochemistry and Technology, Corbridge, Studies In Inorganic Chemistry 6, Jan. 1985.

Laser Arrays May Provide DWDM Measurement Too; Veasey et al., Laser Focus World, May 1999.

The Chemistry of Phosphorus, Toy, pp. 440–485, Pergamon Press 1973.

Glass–Ceramic Formation in the $ZnO-P_2O_5$ System and the Effect of Silica as a Nucleating Agent, Jordery et al., J. Am. Ceram. Soc. 82[9] 2239–45 (1999).

Introduction To Glass Science And Technology, Shelby, Royal Science of Chemistry Paperbacks, 1997.

Multiwavelength Optical Networks, A Layered Approach, Stern et al., 1999.

Optical Fiber Telecommunications II, Miller et al., Academic Press, Inc., 1988.

Glass–Science and Technology, Uhlmann et al., Academic Press, vol. 1, 1983.

Fundamentals of Photonics, Saleh et al., John Wiley & Sons, Inc., 1991.

Applied Physics Letters, Veasey et al., American Institute of Physics, vol. 74, No. 6, Feb. 8, 1999.

Phosphorus And Its Compounds, Coulson, Valence, Oxford University Press, Oxford, p. 210, 1952.

Patents Abstracts of Japan, vol. 1998, No. 5, Apr. 30, 1998 & JP 10 020352 (Toyo Commun. Equipment Co., Ltd.) Jan. 23, 1998.

Patent Abstracts of Japan, vol. 1996, No. 6, Jun. 23, 1996 & JP 08 036195 (Nippon Telegram & Telephone Corp.) Feb. 6, 1996.

Patent Abstracts of Japan, vol. 1996, No. 4, Apr. 30, 1996 & JP 07 318986 (NEC Corp.), Dec. 8, 1995.

U.S. patent application No. 09/597,157, filed Jun. 20, 2000.

* cited by examiner

PROCESS FOR THE FABRICATION OF GLASS CERAMIC STRUCTURES

This is a divisional of U.S. application Ser. No. 09/597,157 filed on Jun. 20, 2000.

BACKGROUND

I. Field of the Invention

The invention relates to the field of glass ceramic composite structures and methods for forming composite glass ceramic structures using a low temperature joining process.

II. Description of the Prior Art

Glass ceramics, which generally consist of an inorganic, non-porous material having a crystalline phase and a glassy phase, are known for specialized applications. Such glass ceramics are manufactured by selecting suitable raw materials, melting, refining, homogenizing, and then hot forming the material into a glassy blank. After the glassy blank is cooled and annealed, a temperature treatment follows whereby the glassy blank is transformed into a glass ceramic by controlled volume crystallization (ceramization). Ceramization is a two-step process; nuclei are formed within the glass at one temperature, and then grown at a higher temperature. The dual structure of the glass ceramic material can impart very special properties, including a very low coefficient of thermal expansion (CTE).

One preferred material, Zerodur® (available from Schott Glass Technologies, Duryea, Pa.) contains about 65–80 weight percent crystalline phase with a high quartz structure, which imparts a negative linear thermal expansion. The remaining glassy phase (which surrounds the crystals) has a positive thermal expansion. The resulting behavior from the negative-CTE crystalline phase and the positive-CTE glassy phase is a material with an extremely low CTE.

Glass ceramics are useful in a wide variety of applications, such as mirror substrates for astronomical telescopes; mirror substrates for X-ray telescopes in satellites, optical elements for comet probes, weather satellites, and microlithography; frames and mirrors for ring-laser gyroscopes; distance gauges in laser resonators; measurement rods as standards for precision measurement technology, and other uses where very low CTE is important.

Large segments of monolithic glass ceramic are often used for many of the applications listed above. However, these large segments of monolithic glass ceramic are often very massive. For instance, larger astronomical telescopes can contain mirrors that exceed 3.6 meters, and the appropriate glass ceramic for use in such telescopes can exceed several tons. Thus, there is a need to develop light-weighted glass ceramic materials to overcome the problems associated with the massive nature of large monolithic segments of glass ceramic.

Various joining methods for optical materials are known; e.g. heat fusion, or frit bonding, however, none provides a low-temperature solution such as is provided for in the present invention.

The known prior art for fabricating light-weighted blanks (i.e. heat fusion, frit bonding) suffers from several drawbacks. For example, pressure and temperature are typically required to form strong joints at high temperature. Developing loading/unloading fixtures for operation at T>600° C. is complex and expensive. Further, heat fusion and frit bonding processes are conducted at temperatures near or above the glass transition temperature ($T_g$) of the starting material (i.e., glassy Zerodur®, or ULE). The viscosity of glass is sufficiently low at these temperatures, such that limited flow (deformation) can occur. This deformation can cause gross dimensional changes, which can yield a defective mirror blank.

Additionally, large, high temperature furnaces (up to 2.0 m in diameter) with stringent thermal tolerances are required for heat fusion and frit bonding. Such furnaces must be custom-made and are often very expensive. Furthermore, glassy Zerodur® shrinks by approximately 3% during ceramization. This shrinkage can cause joint stresses that result in deformation and/or catastrophic failure of the mirror blank during joining.

Yet another difficulty encountered in the prior art is that light-weighted mirror blanks can fail during high temperature joining when thermally induced stresses form at the joint interfaces (especially during cooling to room temperature). Such joint failure results in a 100% loss after a tremendous amount of value has been added to the mirror blank (i.e., machining, polishing, water-jet cutting, assembly, high temperature fixturing, etc.).

A solution to this problem is needed, to allow for the low-temperature joining of fabricated mirror blanks in a step-wise manner.

SUMMARY OF INVENTION

The present invention relates to a low-temperature process for the fabrication of lightweight composite glass ceramic structures, comprised, e.g., of a plurality (e.g., two or more) of glass ceramic components, said glass ceramic components each being polished sufficiently to form at least one joining surface on each component, providing a silicate-containing joining liquid to at least one of the joining surfaces, bringing the joining surfaces of the plurality of glass components together to form a joint, and allowing the joint to cure for a period of time at ambient temperature, whereby a cured joint is formed between said plurality of glass components. It also relates to a glass ceramic composite, comprising a plurality of glass ceramic components, said components being rigidly connected by a silicate-containing layer formed by curing a silicate-containing liquid between the glass ceramic components. The composites are preferably dehydrated by a carefully controlled dehydration process.

For example, A low-temperature process for the fabrication of lightweight composite glass ceramic structures, comprises:
  providing a plurality of glass ceramic components, said glass ceramic components each being polished to form at least one joining surface on each component,
  providing a silicate-containing joining liquid to at least one of the joining surfaces,
  bringing the joining surfaces of the plurality of glass components together to form a joint,
  allowing the joint to cure for a period of time of at least 20 hours at a temperature of at least 20 degrees C., whereby a cured joint is formed between said plurality of glass components, and
  dehydrating the cured joint gradually by raising the temperature slowly and maintaining an elevated temperature below the glass transition temperature of the glass ceramic for at least 20 hours.

This invention also relates to:
  A glass ceramic composite, comprising:
    a plurality of glass ceramic components, said components being rigidly connected by a silicate-containing layer formed by curing a silicate-containing liquid between the glass ceramic components at a temperature of at least 20 degrees C. for at least 20 hours;
  A mirror blank suitable for use in space or flight applications comprising a plurality of glass ceramic components joined by a silicate-containing liquid and cured at a temperature of at least 20 degrees C.;
  A composite glass ceramic structure suitable for use as a microlithography stage comprising a plurality of glass ceramic components joined by a silicate-containing liquid and cured at a temperature of at least 20 degrees C.;
  A method of joining lightweight composite glass ceramic surfaces comprising applying to at least one of said surfaces a silicate-containing solution and curing for an extended period at a slightly elevated temperature above room temperature; and
  A light weight glass-ceramic mirror blank, comprising:
    a face plate which is circular in shape,
    a back plate which corresponds in shape and size to the face plate,
    a plurality of support elements located between said face and back plates, said plurality of supporting elements forming a latticework
    said latticework and face plate and back plate defining a plurality of cells,
    said cells each being provided with a ventilation aperture or being open to the environment,
    said face plate, plurality of supporting elements, and back plate being joined by a silicate-containing liquid in a plurality of joining steps to form a plurality of joints, and at each step, the joint cured at a temperature of at least 20 degrees C. for a period of at least 20 hours.

A light-weighted mirror blank according to the present invention can be comprised of thin (preferably <5 cm) face and back-plates that are fused, joined or bonded to a light-weighted core. FIGS. 1A, 1B, 1C, and 1D illustrate some of the separate components that may comprise a light-weighted Zerodur® mirror blank. While much of the description herein is in terms of the preferred Zerodur® material and mirror blanks, any glass ceramic material in general for any application is included in the invention.

Figure 1A:
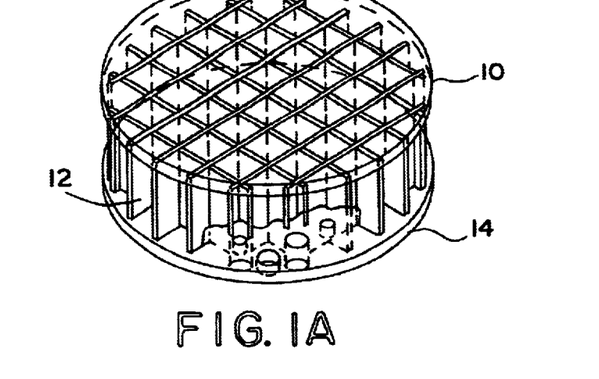
FIG. 1A is a perspective view of a preferred embodiment of a lightweight mirror blank according to the present invention.

With reference to FIG. 1A, the face 10 and back plates 14 may be flat or curved sheets of Zerodur® that are polished on both sides. The light-weighted core may be a polished honeycomb-shaped component, which may be prepared by water-jet cutting segments from a solid slab of Zerodur®. It may also comprise supporting elements 12 arranged to support and space the face and back plates.

After assembly and fusion, a light-weighted mirror blank often has an overall mass/volume ratio that can be 30% of that for a standard (solid) Zerodur® blank, or even as low as 5 or 10% or even lower.

Figure 1B:
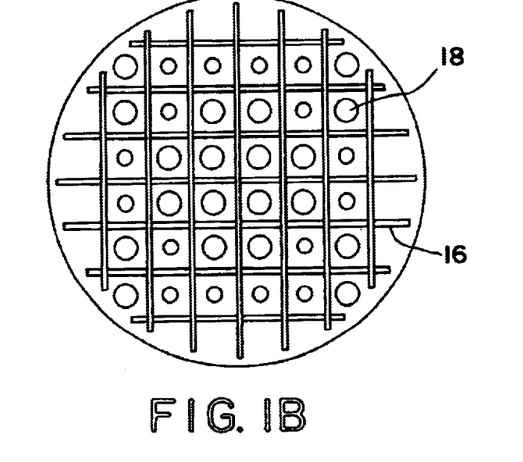
FIG. 1B is a top plan view of a preferred embodiment of a lightweight mirror blank according to the present invention.
Figure 1C:
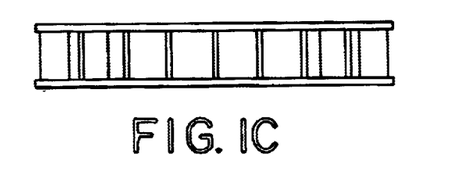
FIG. 1C is a side view of a preferred embodiment of a lightweight mirror blank according to the present invention.

FIG. 1B is a top view illustrating a preferred arrangement including the supporting elements 16 and ventilation holes 18.

Figure 1D:
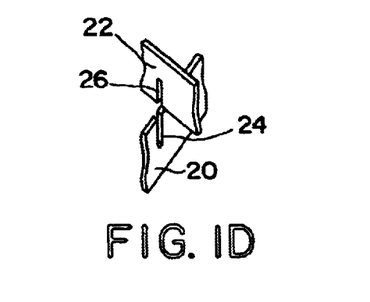
FIG. 1D is a perspective view of a support element of a preferred embodiment of a lightweight mirror blank according to the present invention.

FIG. 1D illustrates a preferred way of joining two supporting elements 20, 22 using corresponding slots 24, 26. Optionally, the slots may be prepared with polished mating surfaces and joined according to the present invention.

Applicants have developed a novel method for fabricating composites, especially light-weighted glass ceramic mirror blanks and microlithography stages, at low temperatures. By low temperatures, as used herein, is meant temperatures generally under the glass transition temperature of the glass ceramic. Temperatures under 500° C. may be suitable for practice of the invention, more preferably below 140° C., even more preferably below 130° C., most preferably, the temperature is $\leq 120°$ C. The light-weighted glass ceramic mirror blanks are intended for applications where dimensional stability, adequate strength and low mass/volume are critical. Such applications include, but are not limited to, optical systems intended for space flight and airborne based applications such as satellites, navigation systems, and remote sensing, land-based systems, and precision structures such as microlithography stages.

The light-weighted structures according to the present invention should be rigid when compared to a monolithic piece of glass ceramic that the structures are replacing. By "rigid" is meant having essentially the same vibrational characteristics as the monolithic piece, being vibrationally, thermally, and otherwise dimensionally stable so as to have essentially indistinguishable opto-mechanical and thermo-optical characteristics from those of the monolithic piece of glass ceramic.

In a preferred embodiment, a low temperature joining technique is provided which allows light-weighted mirror blanks to be fabricated in a step-wise manner.

In a preferred embodiment, a polished face-plate, back-plate and light-weighted core are first prepared from the commercially available glass ceramic known as Zerodur®.

The polished components are cleaned in various aqueous and non-aqueous solutions before being dried and placed in a clean room environment.

A small volume of an aqueous based, silica-containing, joining liquid is applied to the polished joining surfaces of each component. Assembly is then performed in such a way that the joining liquid forms an interface between each component (i.e., between the faceplate and the light-weighted core). After a period of room temperature curing, rigid joints are formed throughout the light-weighted mirror blank, which can withstand tensile stresses >4000 psi.

Furthermore, the dimensional stability of the joined mirror blank is similar to that of pure, monolithic Zerodur® (i.e., the coefficient of thermal expansion of the blank is <75 ppb/K, is unaffected by the joining, and is the same as the monolithic glass ceramic that is being replaced). Such room-temperature-cured mirror blanks are then preferably heated to temperatures ranging from 60 to 120° C. to promote joint dehydration and accelerate the curing process.

In a particularly preferred embodiment, the joints are subjected to an extended duration of slight temperature increase to dehydrate the joints. The removal of water from the joints over an extended period of time dramatically increases the strength, reliability, and rigidity of the structures according to the present invention over the strength, reliability, and rigidity of joints that are quickly dehydrated (e.g. by microwave). Preferable temperatures for the extended duration dehydration include from 20–50 degrees C. for at least 20 hours, more preferably from 30–40 degrees C. for at least 20 hours up to three weeks.

Several advantages arise out of the novel low-temperature joining process. First, a light-weighted mirror may now be constructed piece by piece, thus eliminating some of the risk associated with the high temperature processes. During high temperature processing the entire mirror blank could deform during heating or fracture during cooling, with no indication until furnace unloading. Second, a drying furnace capable of temperatures up to ≈120° C. may be required for low-temperature joining. Such low temperature drying furnaces are commercially available and much less expensive than high temperature furnaces. Third, no material deformation occurs, since low temperature joining is conducted at temperatures well below the $T_g$, where glass ceramics are elastic solids. Fourth, fully ceramized glass ceramics are utilized for low temperature joining. This eliminates the problems associated with the shrinkage that occurs when the glass is converted to a glass ceramic during heat fusion. Fifth, pressure is not typically required for low temperature joining. Thus, no complicated loading/unloading fixtures are necessary.

These and other advantages will become apparent to one of skill in the art having regard for this disclosure.

A lightweight mirror blank represents a substantial investment of time and materials, which makes the mirror blank very expensive. If a defect arises or a catastrophic failure occurs within the unit during high temperature bonding (e.g. heat fusion or frit bonding), the entire value-added process is a loss and the process must start anew. The applicants have developed a novel process which provides for the component by component assembly of large, light-weighted structures, and may be accomplished at low temperatures (i.e. well below the Tg of typical alkali-alumino silicate glasses, <500° C.).

Glass ceramics that are joined according to the instant invention are first prepared by selecting the monolithic pieces to be fabricated into a finished composite structure. Various elements, e.g. mirror components, face plates, back plates, and structural connections are fabricated and sized to yield a composite, light-weighted structure which has a low thermal expansion.

A light-weighted mirror blank, for example, as used herein, is a physical structure onto which a reflective coating may by applied to form a functional mirror. Mirrors are typically used during flight or space applications where remote sensing is being conducted. Satellites which image portions of the earth's surface, or other space-based observation platforms use such mirrors. A high level of stability, structural and thermal, is required to obtain an acceptable image. Space-based applications may be exposed to extremes in temperature, which require an extraordinarily reliable and sound structure.

Glass ceramics are suitable materials for such applications, since they exhibit excellent stability during temperature fluctuations. One such glass ceramic is Zerodur®, which is an example of an especially preferred mirror blank material because it has excellent dimensional stability, owing to a CTE of less than 75 ppb/K from 0–50° C. Other glass ceramics, based on $SiO_2$—containing glasses, including ULE, a titanium silicate glass produced by Corning, Inc, Corning N.Y., Nexcera, a glass ceramic made by Nippon Steel, Tokyo, Japan, VO2 or V2O, a lithium alumino silicate glass ceramic produced in VR China Xinhu Factory, Shanghai, China, Clearceram, Astro-Sitall and Sitall, which are lithium alumino silicate glass ceramics produced by Lytkarino, Moscow, Russia are suitable for the practice of this invention.

Normally, monolithic (i.e. solid) mirrors are utilized to fabricate precision optics due to their ease of manufacture, dimensional stability, and excellent mechanical strength. A monolithic mirror blank is fabricated from a single piece, having no joints, and such mirror blanks are usually massive structures. For example, a standard, cylindrical Zerodur® mirror blank with a diameter of 1.5 m and a thickness of 0.25 m will have a mass of greater than 1,100 kilograms (i.e. greater than 2,400 pounds). Lifting and/or automating such a massive weight often prevents the use of glass ceramic mirror blanks in flight or space-based applications.

The present invention enables a series of components to be assembled, and can overcome the drawbacks associated with the large mass of monolithic mirror blanks. Light-weight mirror blanks, which preferably consist of thin (preferably less than 5 cm) face and back plates, that are attached to a light-weighted core, as shown in FIG. 1. These three components, i.e. face plate, back plate, and light-weighted core, are joined according to the present invention to form a stable, rigid, light-weighted mirror blank at low temperature.

With reference to FIG. 1, a novel light-weighted mirror blank according to the present invention is seen. The outer surfaces of the mirror blank 10 may be flat, curved, concave, convex, or any geometrically desired shape. The face and back plate are preferably between 0.5 cm and 5 cm in thickness, most preferably about 1–3 cm thick.

Beneath the face plate (from the perspective of FIG. 1) is a lattice of supporting elements 12 forming a light weighted core. Each of these elements is also preferably a glass-ceramic to yield a uniform coefficient of thermal expansion for the unit. The supporting elements are illustrated as aligned in a crosshatched manner, but any suitable arrangement, which provides dimensional stability, is acceptable. The supporting elements are preferably designed for sufficient stability without excessive weight. The elements may have voids drilled within (e.g. by water cutting or mechanical drilling) to further reduce the mass of material. Other shapes and styles of supporting elements may be designed by one of skill in the art having regard for this disclosure.

In an alternative embodiment, the light-weight core is formed from monolithic Zerodur® by water-jet cutting, ultrasonic drilling, laser cutting, diamond saw drilling, etc.

When such a light weight mirror blank is finished, the overall mass may be reduced by as much as 70% or more when compared to a monolithic structure, yet retaining sufficient CTE and strength characteristics to be perfectly suitable for airborne or space borne applications where high tolerances are expected.

Appropriate components (including a face plate, back plate, and light weighted core) should be selected to obtain the maximum benefits of the instant invention. For example, a plurality of components to be fabricated into a larger structure would be selected as follows.

A plurality of components of glass ceramic with nearly identical CTE's are selected. By way of example, three slabs of Zerodur™ with nearly identical CTE (i.e., each within ±25 ppb/K) will be fabricated. In this example, a 30 cm mirror blank is to be fabricated.

Two slabs will have nominal dimensions of 30 cm in diameter and 3 cm thick. These two slabs will form the face and back-plates of a light-weighted mirror blank according to the instant invention. The third slab will have a diameter and thickness of approximately, 30 cm and 4 cm, respectively. This third slab will be used to fabricate the light-weighted core.

The two slabs intended for the face and back-plates are cut and/or ground to an appropriate thickness, and then polished. The surfaces intended for joining are prepared with a surface figure of $1/3\lambda$ ($\approx$200 nm peak to valley). Although the face and back-plates may be flat, other geometric shapes are possible (i.e., they may be concave, convex, or of other suitable shape).

A plurality of holes are drilled through the back-plate to reduce the overall weight of the mirror blank, and to provide an opening for each cell within the light-weighted core.

The slab intended for the light-weighted core is cut and ground to an appropriate thickness and then polished. Both surfaces of the core have a surface figure of $1/3\lambda$ ($\approx$200 nm peak to valley). Again, the core may be flat or of other geometric shape (i.e., either side could be concave, convex, or other suitable shape as appropriate to provide surfaces that will "mate" with the face and back plates during assembly).

The core is then weight-reduced by removing excess material without compromising the structural integrity of the core. For example, it may be converted into a honeycomb-like shape by water-jet cutting, or any other method in the cutting art that can be used to transform a solid piece of glass into a honeycomb-like structure (i.e., laser cutting, ultrasonic drilling, drilling and cutting with conventional equipment, etc.). The machined core will be referred to as the light-weighted core hereafter. If necessary, the surfaces of the light-weighted core are re-finished to remove any surface damage that results from the weight reducing step.

After the component pieces are selected and prepared, the next step of the instant novel process preferably includes cleaning. Each component (face-plate, back-plate, light-weighted core) is, if necessary, cleaned simultaneously or independently, using the following procedure:

First, the components will be immersed in a cleaning solution comprised of 10 vol % Micro Solution and 90 vol % deionized $H_2O$ for approximately 30 minutes. This solution is preferably agitated by stirring, rocking, vibration or forced circulation. The cleaning solution is then removed and the component immersed in deionized $H_2O$ for approximately 5 minutes.

The component is then removed from the $H_2O$ and immersed in a $KOH_{(aq)}$ solution (0.01 to 9.0 M) for approximately 5 minutes. Subsequently, the components are removed from the KOH(aq) solution and immersed in deionized $H_2O$ for approximately 5 minutes.

Finally, each component is rinsed with high purity (low residue) ethanol, then rinsed with high purity (low residue) methanol, and transported into a clean room environment. After transporting the components into the clean room, deionized $N_2$ gas will preferably be used to remove any residual methanol from the joining surfaces. Optionally, a $CO_2$ sno-gun is used to remove any dust or particulate debris from the joining surfaces.

At this point, all joining surfaces are chemically clean and free from particulate debris. The clean, dry components are then stored, such that their joining surfaces are not in contact with any source of particulate or chemical contamination.

Figure 2:
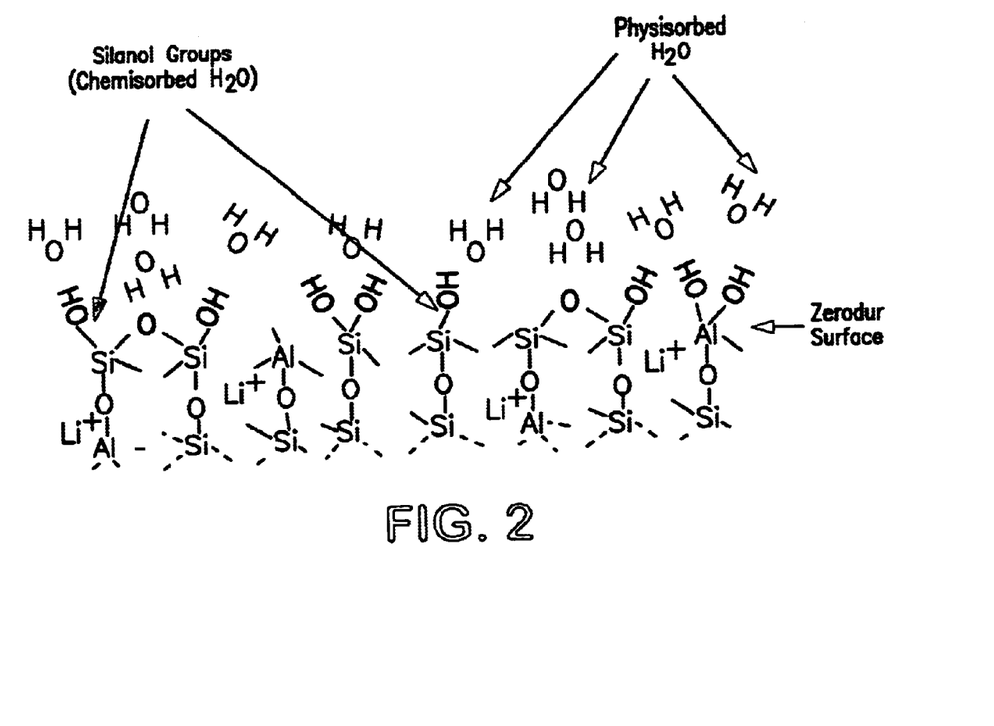
FIG. 2 is a diagrammatic representation of the molecular structure of a surface of a glass ceramic material suitable for joining according to the present invention.

Once the component pieces are polished and cleaned to the requisite degree, the surfaces to be joined should be free of debris and contain a large concentration of silanol (SI—OH) groups, as may be seen in FIG. 2.

An exemplary silicate "joining liquid" with the general oxide composition shown in Table I is prepared and is used for low temperature joining according to the present invention. The joining liquid typically contains silanol ($Si(OH)_4$ $_{(aq)}$), alkali ($Na^+_{(aq)}$) and other aqueous species (i.e., $H_2O$ $_{(aq)}$, $H_3O^+_{(aq)}$, $OH^-_{(aq)}$). Although not wishing to be bound by the theory of joint formation, the notations under "comments" give a theoretical explanation for the functionality of species in the joining liquid.

TABLE I

Compositional Space for the Joining Liquid

| Oxide Compone | Wt % | Comments |
| --- | --- | --- |
| $H_2O$ | 50–99.9 | $H_2O$ is the solvent, and $H_2O$ molecules may contribute to joint strength by forming hydrogen bonds across the joint interface |
| $SiO_2$ | 0.01–40 | The $SiO_2$ component of the liquid is primarily responsible for joint rigidity (i.e., -Si-O-Si cross links) |
| $Al_2O_3$ | 0–10 | $Al_2O_3$ could be added to the liquid to increase the chemical durability of the resulting joint, and to make the interfacial region more chemically similar to Zerodur ™ (a lithium alumino-silicate glass ceramic) |
| $Li_2O$ | 0–20 | $Li^+$ ions could contribute to joint strength by forming $Li^+$/NBO (non-bridging oxygen, $SiO^-$) bonds. |
| $Na_2O$ | 0–20 | $Na^+$ ions could contribute to joint strength by forming $Na^+$/NBO bonds. |
| $K_2O$ | 0–25 | $K^+$ ions could contribute to joint strength by forming $K^+$/NBO bonds. |
| MgO | 0–10 | $Mg^{2+}$ ions could contribute to joint strength by forming $Mg^{2+}$/NBO bonds. |
| CaO | 0–10 | $Ca^{2+}$ ions could contribute to joint strength by forming $Ca^{2+}$/NBO bonds. |
| BaO | 0–10 | $Ba^{2+}$ ions could contribute to joint strength by forming $Ba^{2+}$/NBO bonds. |
| SrO | 0–10 | $Sr^{2+}$ ions could contribute to joint strength by forming $Sr^{2+}$/NBO bonds. |

Other suitable joining liquids include lithium silicate liquid, potassium silicate liquid, magnesium silicate liquid, calcium silicate liquid, barium silicate liquid, strontium silicate liquid, mixed alkali silicate liquid, mixed alkali/alkaline earth silicate liquid, mixed alkaline earth silicate liquid, and silicate liquid, where "liquid" refers to an aqueous solution.

Figure 3:
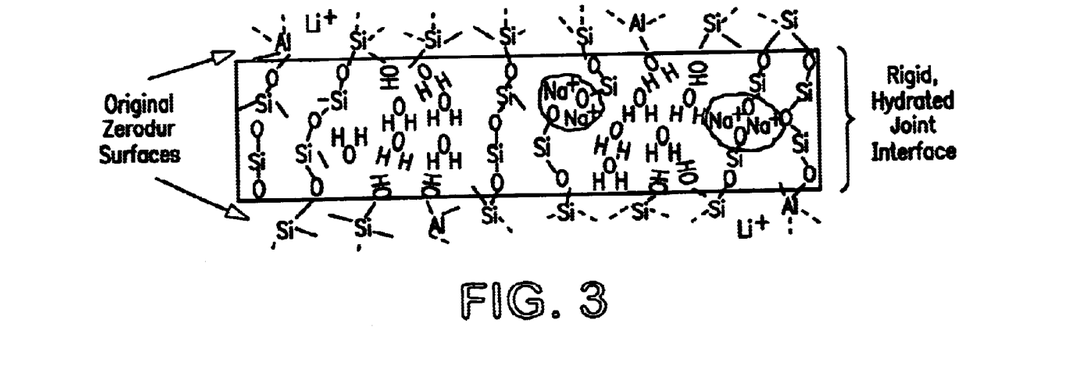
FIG. 3 is a diagrammatic representation of the molecular structure of a joined glass ceramic material according to the present invention.

Joining is initiated by sandwiching the appropriate liquid between two clean surfaces, as shown in FIG. 3. Only a small volume (preferably $\approx$0.5 $\mu$l/cm$^2$) of the joining liquid is required to form a strong joint. Larger or smaller volumes may be used by one of skill in the art having regard for this disclosure. It is preferred that at a minimum there be at least 0.01 $\mu$l/cm$^2$.

In another embodiment of the present invention, ground or fritted Zerodur® or silica-containing glass ceramic could be added to the joining liquid to form a stronger join; fill in voids at the joint interface, and promote joint dehydration.

A joining liquid with the general composition shown in Table I is used to join the face and back plates to the light-weighted core. First, particulate debris is preferably removed from the joining liquid using filtration and/or centrifugation. The two joints required to fabricate a light-weighted mirror blank (face-plate to light-weighted core, and back-plate to light-weighted core) could be fabricated simultaneously, but preferably they are fabricated separately.

Joining liquid is applied to one or both surfaces intended for joining (i.e., to the back of the faceplate and the mating side of the light-weighted core) by any of a number of coating techniques. For example, spin coating may be used, where an excess of joining liquid is to be applied to the surface, and then the majority removed by high-RPM spinning.

Another application technique is dip coating, where the surface is dipped into a vat of joining liquid of appropriate viscosity and then removed at an appropriate speed to ensure that an adequate volume (at least 0.01 $\mu l/cm^2$) of joining liquid remained.

Another suitable method is pipetting or auto-dispensing drops of joining liquid at various points on the joining surface. Upon joining, these drops would spread and provide an adequate volume of joining liquid. Yet another method contemplated by the instant invention includes joining the components while submerged in a vat of joining liquid, i.e. assembling the mirror blank while submerged. Another method includes bringing the two components into contact and allowing the joining liquid to be introduced from the side and be drawn between the two surfaces to be joined by capillary action. Capillary forces will "pull" the liquid into the interfacial region and a joint will be formed.

One skilled in the art having regard for this disclosure may envision the use of any automated technique commonly used to dispense liquid in, e.g., the adhesives industry. In a preferred embodiment, reproducible volumes of joining liquid are applied to the joining surfaces.

In an especially preferred embodiment, premature curing (hardening) of the liquid prior to joining is avoided by performing the joining in a humid environment.

In a preferred embodiment, the faceplate is brought into contact with the light-weighted core using an alignment apparatus. The joining liquid forms an interface between the two clean, polished surfaces. The joined component should be allowed to cure for at least 1 hour before attempting to fabricate the second joint.

After allowing at least 1 hour for the first joint (face plate to light-weighted core) to cure, joining liquid will then be applied to the back plate. The back plate is then brought into contact with opposite side of the light-weighted core using an alignment apparatus. The joining liquid then spreads and forms an interface between the two components. In an especially preferred embodiment, each hole in the back-plate is aligned with each cell (void) in the light-weighted core.

Aligning the holes in the back-plate with the cells in the light-weighted core ensures that no air is trapped within the light-weighted mirror. Trapped air can be problematic, especially when the mirror blank is used for an application where appreciable temperature fluctuation can occur. Temperature fluctuations would change the air pressure within an airtight compartment and could cause local variations in the surface figure of the front faceplate. Such local variations in surface figure could compromise the performance of the mirror.

Although not wishing to be bound by the following theoretical explanation, it is believed that the following mechanism explains the development of such mechanically strong, low CTE joints by the low-temperature joining process.

Once the liquid is sandwiched between the two surfaces, condensation reactions (Equation (1)) begin as silanol groups combine to form —Si—O—Si— linkages, while releasing (condensing) $H_2O$.

$$\text{—Si—OH+OH—Si—} \rightarrow \text{—Si—O—Si—} + H_2O \quad (1)$$

A rigid joint is formed when the —Si—O—Si— cross-linking spreads throughout the interfacial region and eventually binds the two joining surfaces together, as shown in FIG. 3. The resulting joint is composed of a hydrated, silicate solid. It is a sodium silicate solid if a sodium silicate liquid is used for the joining process.

It is believed that the Si—O—Si— linkages are primarily responsible for joint strength. While the $H_2O$ present in the interfacial region (i.e., that formed by condensation reactions and that originally present in the joining liquid) can evaporate from the joint interface, diffuse into the joining material, or form hydrogen bonds across the interface, it is believed that $H_2O$ can also contribute to the overall joint strength. Finally, the $Na^+$ ions are expected to form chemical bonds between non-bridging oxygen (NBO) atoms within the joint interface. The result of —Si—O—Si— cross-linking, hydrogen bonding and $Na^+$/NBO bonding is a rigid joint that typically has a strength $\geq 4000$ psi.

The residual $H_2O$ that remains in the interfacial region after room temperature curing may contribute to the overall joint strength by providing hydrogen bonding. However, in an alternative embodiment of the present invention, the joint is dehydrated. If, for example, the end application for the joint requires stability at temperatures >100° C., removal of $H_2O$ will reduce the risk of failure.

The fully joined, light-weighted mirror blank would be allowed to cure at room temperature for at least 1 day, and preferably for 7 days before a dehydration should be attempted.

Not all forms of dehydration will work in preparing joints according to the instant invention. For example, when Zerodur® —Zerodur® joints are prepared at room temperature and then subjected to microwave treatment, catastrophic failure generally occurs. Dehydration without catastrophic failure can best be achieved by using a slow, controlled heat-treatment schedule according to the present invention.

When small samples of glass-ceramic Zerodur® (30×20×10 mm, joining surface 10×10 mm) are fabricated according to the present invention, after 1-week room temperature cure, these joints are strong enough that they cannot be fractured by hand.

When excessive force is applied, the resulting fracture does not necessarily occur at the joint interface. When small Zerodur® —Zerodur® samples are fractured by impacting them on a hard surface, the fracture often results in pullout of material on either side of the joint interface. Zerodur® —Zerodur® joints formed at room temperature according to the instant invention show excellent strength characteristics as evident from the flexural strength testing results shown in FIG. 4. A room temperature cured Zerodur® —Zerodur® joint has a flexural strength, which can exceed 9,000 psi.

The large flexural strengths (5,000 to 10,000 psi) achieved by joining and curing Zerodur® at room temperature are sufficient for space-based applications (where the allowable stress for Zerodur® is 750 psi). However, the strength and stability of such room-temperature-cured joints is deleteriously affected by temperature ramps (>10 K/h).

Quickly heating room temperature cured Zerodur® —Zerodur® joints to temperatures >50° C. (i.e., by subjecting the joint to excessive microwave radiation) will often cause catastrophic failure. Although not wishing to be bound by this theory, it is believed that residual H₂O at the joint interface is likely responsible for the strength degradation and proneness for failure when Zerodur® —Zerodur® joints are quickly heated.

When a room temperature cured, Zerodur® —Zerodur® joint is heated at >10 K/h to temperatures >50° C, the vapor pressure of H₂O within the hydrated joint interface is increased. This increase in vapor pressure cannot necessarily be accommodated by H₂O diffusion into the bulk Zerodur®. As noted previously, Zerodur® is a glass ceramic, which contains ≈70 wt % of ≈50 nm lithium alumino silicate crystals in a matrix of silica-rich glass.

Figure 6:
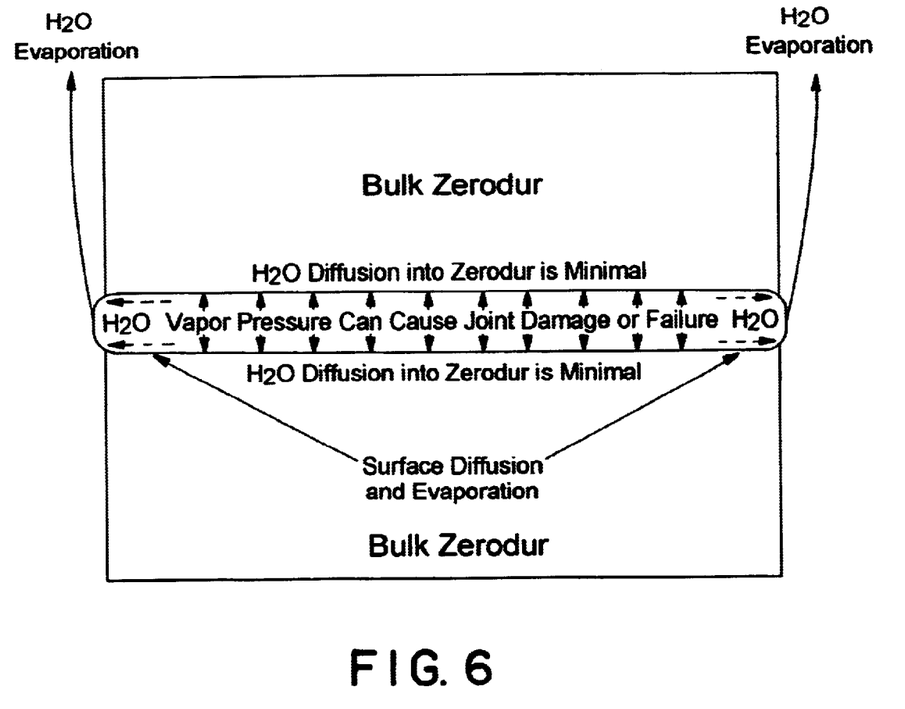
FIG. 6 is a diagrammatic representation of the vapor pressure build up between bulk Zerodur® blocks.

Most diffusion models for glass-ceramics assume that the crystalline phase is impermeable to diffusing species, such as OH—, H₃O⁺ or H₂O. Thus, the crystalline nature of Zerodur® likely blocks H₂O diffusion into the bulk, and it is believed that the only way for H₂O to escape the hydrated joint interface is by surface diffusion to the edge of the sample, see FIG. 6. Once the H₂O reaches the edge of the joint, it can easily be removed by evaporation.

When a Zerodur® —Zerodur® joint is rapidly heated, and the vapor pressure within the joint interface is not offset by H₂O surface diffusion, interfacial damage or joint failure can occur. Interfacial damage is generally apparent in the form of small (1 mm) bubbles that form at the joint interface. Such damage usually occurs when a room-temperature-cured, Zerodur® —Zerodur® joint is heated at ≧5 K/h in a furnace or oven. Sufficiently rapid heating (i.e., subjecting a room temperature cured Zerodur® —Zerodur® joint to microwave radiation, in a commercial microwave oven) often causes catastrophic failure, as the joint simply "pops" apart.

A novel slow and systematic heat-treating technique has been developed to dehydrate room-temperature-cured glass-ceramic and Zerodur® —Zerodur® joints. The heat-treatment schedule is shown in Table II. This heat-treatment schedule is suitable for joint dehydration where the mean free path for H₂O surface diffusion is preferably no greater than 12.5 mm. This exemplary treatment schedule is a preferred schedule; slower treatments are possible and may be preferable for different types of joints. Such treatment regimens may be easily by one skilled in the art having regard for this disclosure.

TABLE II

Preferred Heat Treatment Schedule for Dehydrating 25 × 25 mm Joints

| Step | Ramp Rate (K/h) | Temperature (° C.) | Hold (h) |
|---|---|---|---|
| 1 | 0.001–2 | 40 | 10–40 |
| 2 | 0.001–3 | 50 | 15–60 |
| 3 | 0.001–3 | 60 | 20–80 |
| 4 | 0.001–3 | 70 | 20 |
| 5 | 0.001–3 | 80 | 20 |
| 6 | 0.001–3 | 90 | 20 |
| 7 | 0.001–3 | 100 | 20 |
| 8 | 0.001–3 | 120 | 20 |

Figure 4:
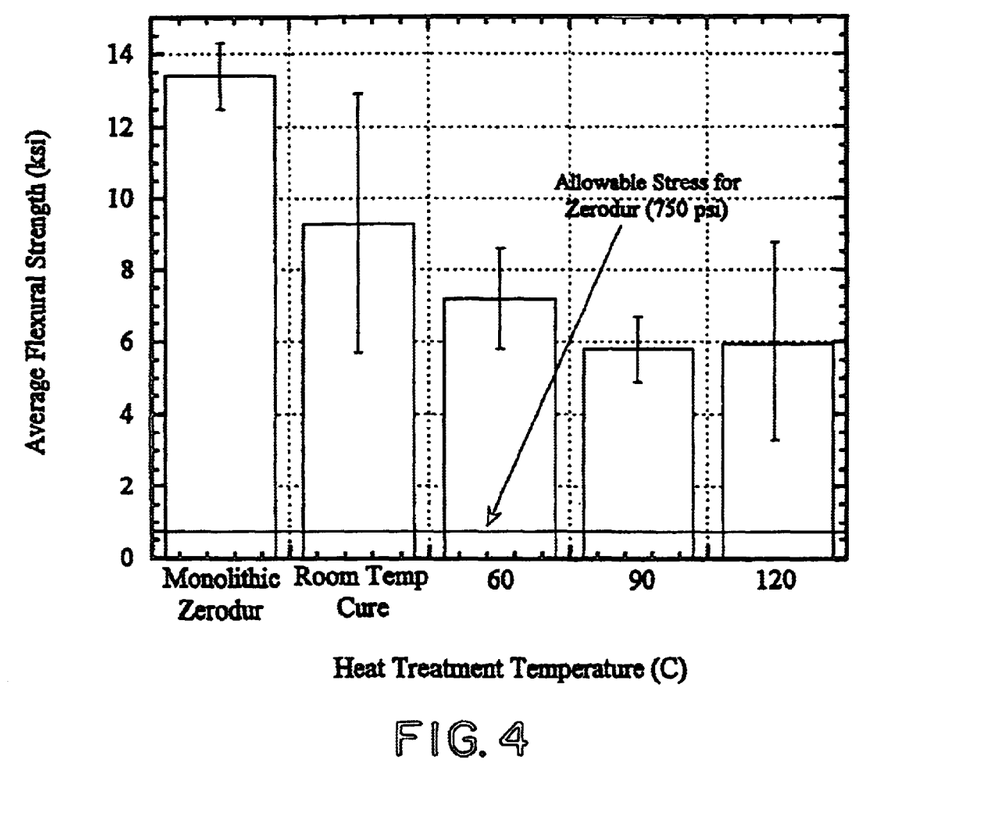
FIG. 4 is a graphical representation of the average flexural strength of monolithic Zerodur® compared to various joined Zerodur® components.
Figure 5:
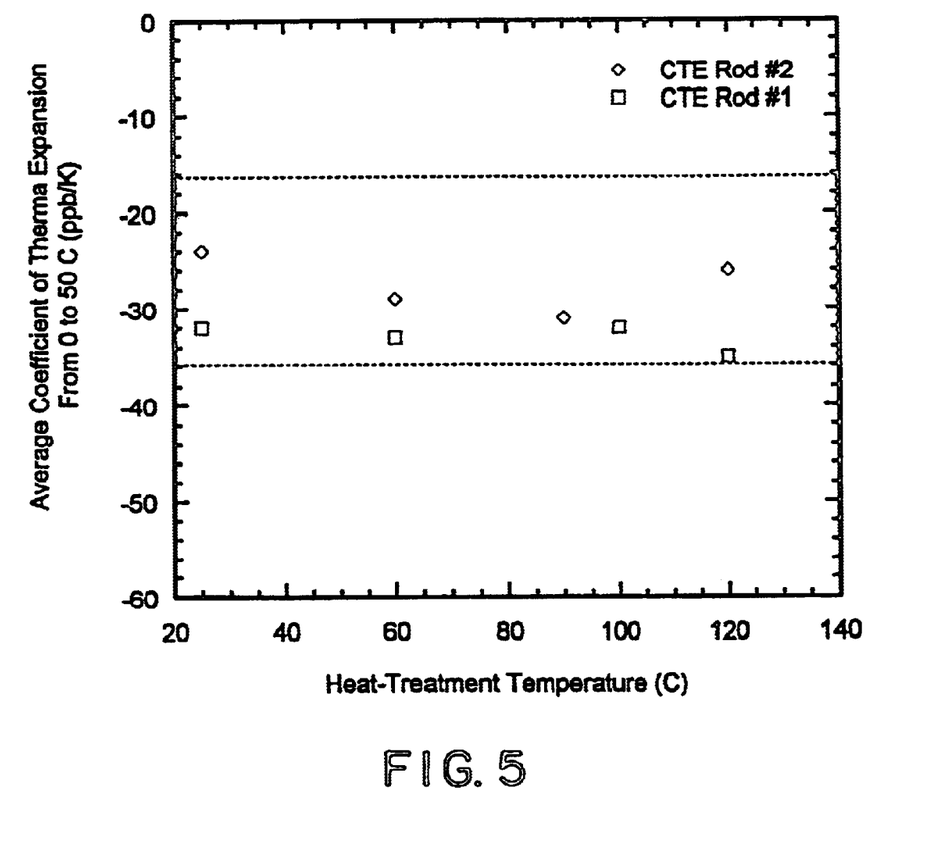
FIG. 5 is a graphical representation of the average CTE of joined Zerodur® rods.

The strength of heat-treated Zerodur® —Zerodur® and other glass-ceramic joints may be slightly less than those cured at room temperature (FIG. 4), and this is likely due to the depletion of hydrogen bonding at the joint interface (as H₂O is removed by evaporation). However, the strength and dimensional stability of such heat-treated joints are more than sufficient for use in light-weighted mirror blank applications and others requiring at least 750 psi strength. FIG. 4 shows that the flexural strength of Zerodur® —Zerodur® joints is always at least five times greater than the allowable stress for Zerodur®, regardless of heat-treatment temperature from 60 to 120° C. Furthermore, the dimensional stability does not seem to be affected by heat-treatments up to 120° C., since the CTE of Zerodur® —Zerodur® joints were not statistically different from the average CTE of a monolithic Zerodur® slab (i.e., −26±10 pb/K) as shown in FIG. 5.

Heat-treatment at temperatures above 120° C. may further increase the strength of a Zerodur® —Zerodur® joint. The interfacial region that joins two Zerodur® sections together is essentially a sol-gel derived material (i.e., the sodium silicate liquid (sol) was transformed to a rigid interfacial region (gel) by curing). Sol gel materials derived from sodium silicate liquid can be heat-treated at temperatures exceeding 600° C., to increase the density and strength. However, the primary goal of a low-temperature joining process is to avoid as much excessive heat treatment as is possible.

In yet another preferred embodiment, such joined components may be overcoated with a polymeric coating to prevent the loss of dried joining liquid after the joint has been cured. In many applications, the avoidance of particulate debris, such as flaked off dust, is highly desirable and the addition of a polymeric or other sealant coating is preferred.

EXAMPLES

Zerodur® samples with approximate dimensions of 60×25×25 mm were used for all joining experiments. One of the 25×25 mm faces on each sample was polished, with a surface figure of at least ⅓λ (200 nm peak to valley, this surface will be referred to as the joining surface), while the other 25×25 mm face was simply polished to a transparent finish.

The joining surfaces were cleaned using various solutions. First, the samples were ultrasonically cleaned in a 10:90 volumetric ratio of Micro Cleaning Solution and deionized H₂O. The samples were then rinsed with deionized H₂O before being ultrasonically cleaned with 3.0 M KOH$_{(aq)}$ solution. After cleaning with KOH$_{(aq)}$ solution, the samples were rinsed with deionized H₂O, ethanol and methanol before being dried with deionized N₂ gas. Finally, a CO₂ sno-gun was used to remove particulate debris from the joining surfaces. The clean samples were placed within a clean, dust-free enclosure until joining was conducted.

The Zerodur® samples were joined using a low temperature joining process. When making a joint by the low temperature joining process, sodium silicate liquid is sandwiched between two clean, polished, joining surfaces. A mechanically strong joint is formed when the liquid cures and forms a rigid interface between the two joining surfaces.

A sodium silicate liquid containing ≈15 wt % SiO₂ and ≈6 wt % Na₂O was used for all Zerodur® —Zerodur® joining experiments conducted for strength evaluation. The joining liquid was prepared by diluting commercially available sodium silicate liquid with deionized water. After dilution, the resulting liquid was filtered with a 0.2 μm filter, before centrifugation was used to separate and remove any remaining particulate debris. A 3 μl drop of the centrifuged sodium silicate joining liquid was applied to the joining surface of a Zerodur® sample using a pipette. A second joining surface was then brought down upon the 3μ drop to spread and sandwich the joining liquid between the two Zerodur™ surfaces. All of the joining experiments were conducted in a clean, dust free enclosure.

Figure 7:
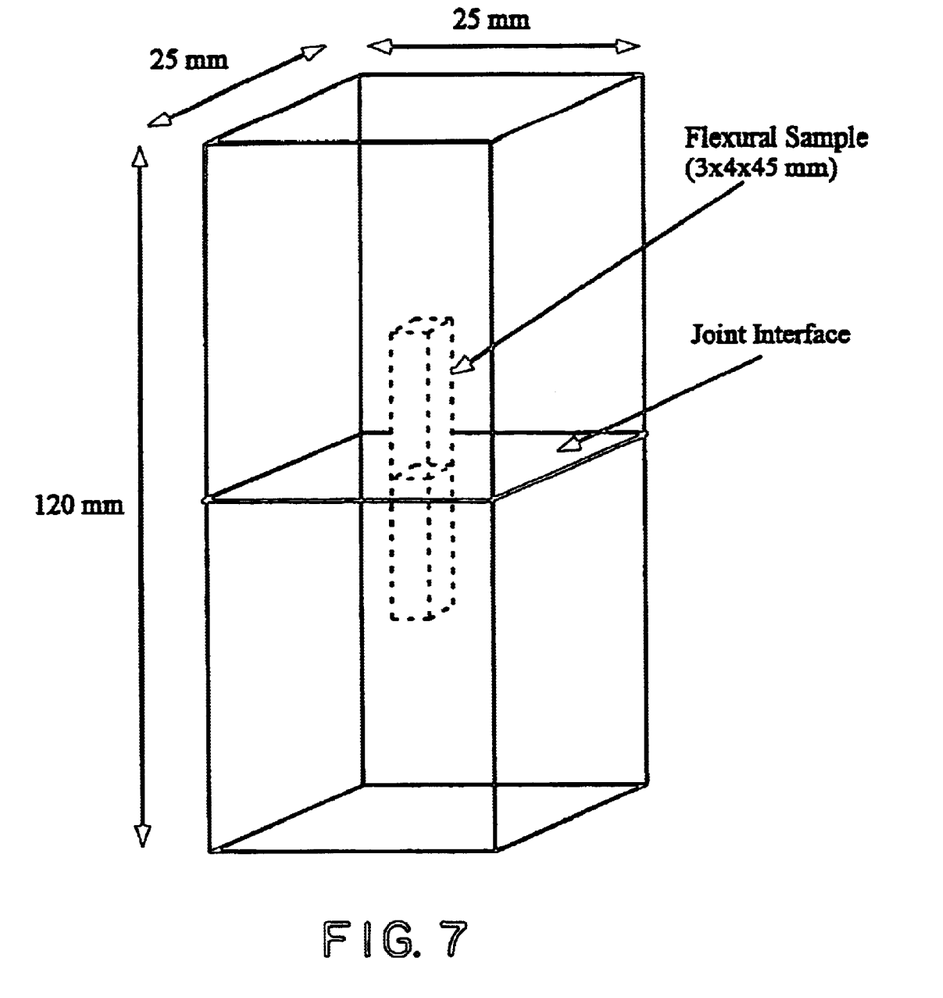
FIG. 7 is a perspective view of a joined flexural sample.

The joint assembly (two 60×25×25 mm samples joined with the sodium silicate liquid) was allowed to cure for at least 7 days at room temperature (15 to 30° C.). Some joint assemblies were also heat-treated at temperatures ranging from 60 to 120° C. Flexural samples were machined from the room temperature cured and heat-treated joint assemblies, as shown in FIG. 7.

Care was taken during machining to ensure that the samples were not subjected to elevated temperatures (>50° C.) or corrosive liquids (i.e., acid-based pitch remover). The goal was to machine samples from the joint assemblies without deleteriously affecting the joint strength. The resulting flexural samples were nominally 3×4×45 mm, in accordance with the ASTM standard C1161-94 "Standard Test Method for Flexural Strength of Advanced Ceramics at Ambient Temperature." The 4×45 mm faces of the flexural specimens were ground with 20 $\mu$m $Al_2O_3$ grinding media before flexural strength tests were conducted.

Flexural strength testing was conducted in accordance with ASTM standard C1161-94. Flexural strength was measured for Zerodur® —Zerodur® joints that had been cured at room temperature, and those heat-treated at 60, 90, or 120° C. for 20 h. The flexural strength of monolithic Zerodur® was also measured for comparative purposes (note that the monolithic Zerodur® flexural surfaces were also prepared with a 20 $\mu$m $Al_2O_3$ grinding media).

The results from the flexural strength testing are shown in FIG. 4. The average flexural strength of the Zerodur® —Zerodur® joints was greater than 5,000 psi, regardless of the heat-treatment temperature. However, the Zerodur® —Zerodur® joints always yielded a lower flexural strength than the monolithic Zerodur® samples, which had an average flexural strength of >13,000 psi. A flexural strength of 5000 psi is more than six times greater than the allowable working stress (750 psi), and more than three times greater than the ultimate handling stress (1,500 psi) for Zerodur®. Thus, Zerodur® —Zerodur® joints prepared by the low temperature joining process and heat treated at temperatures ranging from 60 to 120° C. are expected to be suitably strong for use light-weighted Zerodur® mirror blanks.

The CTE of components joined according to the present invention is most preferably the same as that of monolithic glass ceramic materials. The minimization or elimination of joint-induced CTE variation ensures dimensional stability when the mirror-blank is used for applications, such as remote sensing.

Testing was conducted to determine whether a composite glass ceramic joint has the same CTE as monolithic glass ceramics. All samples intended for CTE evaluation were obtained from the same slab of Zerodur® (Melt Number F-9831). The intrinsic variation of CTE in the slab was determined by measuring the CTE at three positions. The three values of CTE were −33, −25 and −20 ppb/K (each CTE reported herein is an average value, measured from 0 to 50° C.). Note that the typical measurement accuracy for the CTE in the temperature range of 0 to 50° C. is ±10 ppb/K and the precision under repeatability conditions is ±5 ppb/K. Therefore, the average CTE of the Zerodur® slab from 0 to 50° C. (Melt Number F-9831) was −26±10 ppb/K.

Figure 8:
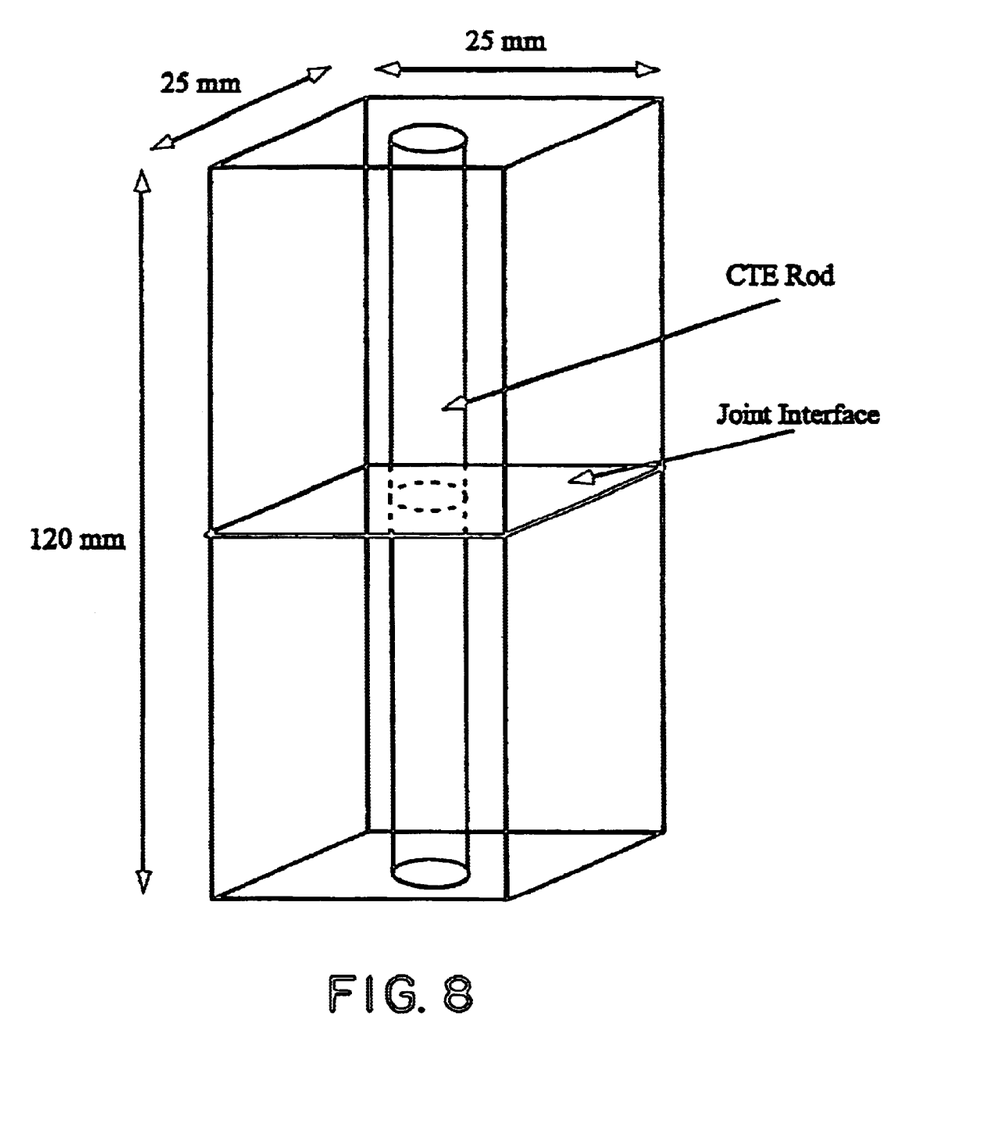
FIG. 8 is a perspective view of a joined CTE rod.

Samples with the nominal dimensions of 60×25×25 mm were used to prepare Zerodur® —Zerodur® joint assemblies for CTE evaluation. These samples were cleaned and joined using the same procedures described in the Mechanical Strength section (above). Two Zerodur® —Zerodur® joint assemblies were prepared for CTE evaluation and allowed to cure for at least 7 days at room temperature. A CTE rod (6 mm diameter) was core drilled from each of the two joint assemblies, as shown in FIG. 8.

The CTE of the first rod was measured before and after 20 hour heat-treatments at 60, 100 and 120° C., while the CTE of the second rod was measured before and after 20 hour heat-treatments at 60, 90 and 120° C. FIG. 4 compares the CTE data collected from each of the joined CTE rods with the average CTE of the Zerodur™ slab (melt number F-9831). Note that all CTE data are within 10 ppb/K of the average CTE measured for the Zerodur® slab. Thus, the low temperature joining process does not affect CTE, and when the process according to the present invention is used to fabricate light-weighted Zerodur® mirror blanks, remarkably superior and stable composite structures are formed.

We claim:

1. A low-temperature process for the fabrication of light-weight composite glass ceramic structures, comprising:

providing a plurality of glass ceramic components, said glass ceramic components each being polished to form at least one joining surface on each component, providing a silicate-containing joining liquid to at least one of the joining surfaces, bringing the joining surfaces of the plurality of glass components together to form a joint, allowing the joint to cure for a period of time of at least 20 hours at a temperature of at least 20 degrees C., whereby a cured joint is formed between said plurality of glass components, and dehydrating the cured joint gradually by raising the temperature slowly and maintaining an elevated temperature below the glass transition temperature of the glass ceramic for at least 20 hours.

2. A method as claimed in claim 1, wherein the step of dehydrating comprises gradually raising the temperature at a rate which allows dehydration of the joint without imparting damage to the joint from accelerated $H_2O$ evaporation.

3. A process as claimed in claim 2, wherein the dehydrating temperature is from 60 to 600 degrees C.

4. A process as claimed in claim 3, wherein the temperature is below 120 degrees C.

5. A process as claimed in claim 1, wherein the glass ceramic components are components made of a material sold under the trademark ZERODUR®.

6. A process as claimed in claim 1, wherein the glass ceramic components include a low expansion material prepared by partially ceramizing a lithium alumino silicate glass.

7. A process as claimed in claim 1, wherein the glass ceramic components include a material selected from the group consisting of ULE, NEXCERA CLEARCERAM VO2, ASTROSITALL and SITALL.

8. A process as claimed in claim 1, wherein the silicate containing liquid is a lithium silicate containing liquid or a sodium silicate containing liquid.

9. A process as claimed in claim 1, wherein the silicate containing liquid is an alkali silicate, mixed alkaline earth silicate, or mixed alkali/alkaline earth silicate liquid.

10. A process as claimed in claim 2, wherein the step of gradually raising the temperature comprises increasing the temperature at a rate less than or equal to 3 degrees K/hour.

11. A process as claimed in claim 10, wherein the temperature is periodically stabilized and held.

12. A process as claimed in claim 11, wherein the temperature is stabilized at intervals of from 5 to 20 degrees C. and held for at least 10 hours.

13. A process as claimed in claim 12, wherein the temperature is stabilized at intervals of about 10 degrees C. and held for about 20 hours.

14. A process as claimed in claim 1, wherein the components include at least one component with a hollowed out light-weighted portion.

15. A process as claimed in claim 1, wherein the components comprise segments of a light-weighted core.

16. A process as claimed in claim 1, wherein the components include a mirror blank.

17. A process as claimed in claim 1, wherein the period of time is at least one day.

18. A process as claimed in claim 1, wherein the period of time is at least one week.

19. A process as claimed in claim 1, wherein the step of providing the silicate containing liquid comprises applying the silicate containing liquid in an amount of at least 0.01 microliter/cm$^2$.

20. A process according to claim 1, wherein the glass ceramic components have a CTE of less than 75 ppb/K from 0–500° C.

* * * * *